(12) United States Patent
Weerawarna

(10) Patent No.: US 7,393,905 B2
(45) Date of Patent: *Jul. 1, 2008

(54) CROSSLINKED MIXED CARBOXYLATED POLYMER NETWORK

(75) Inventor: S. Ananda Weerawarna, Seattle, WA (US)

(73) Assignee: Weyerhaeuser Company, Federal Way, WA (US)

( * ) Notice: Subject to any disclaimer, the term of this patent is extended or adjusted under 35 U.S.C. 154(b) by 234 days.

This patent is subject to a terminal disclaimer.

(21) Appl. No.: 11/026,244

(22) Filed: Dec. 29, 2004

(65) Prior Publication Data

US 2006/0142434 A1 Jun. 29, 2006

(51) Int. Cl.
*C08L 1/00* (2006.01)
*C08F 283/00* (2006.01)

(52) U.S. Cl. .................. 525/420; 525/54.21; 524/37; 524/51; 524/53; 524/501

(58) Field of Classification Search ................ 525/420, 525/54.21; 524/37, 51, 53, 501
See application file for complete search history.

(56) References Cited

U.S. PATENT DOCUMENTS

| | | | |
|---|---|---|---|
| 2,811,519 A | 10/1957 | Touey | |
| 3,417,069 A * | 12/1968 | Davis et al. | ........... 525/533 |
| 3,574,818 A | 4/1971 | Takehara et al. | |
| 3,638,698 A | 2/1972 | Woodman et al. | |
| 3,900,463 A | 8/1975 | Yada et al. | |
| 3,965,091 A | 6/1976 | Holst et al. | |
| 4,063,018 A | 12/1977 | Ohnaka et al. | |
| 4,066,828 A | 1/1978 | Holst et al. | |
| 4,068,067 A | 1/1978 | Holst et al. | |
| 4,418,524 A | 12/1983 | Ito et al. | |
| 4,507,474 A | 3/1985 | Raehse et al. | |
| 4,547,570 A | 10/1985 | Garner | |
| 4,615,923 A | 10/1986 | Marx | |
| 4,650,716 A | 3/1987 | Gelman | |
| 4,650,863 A | 3/1987 | Felcht et al. | |
| 4,689,408 A | 8/1987 | Gelman | |
| 4,734,478 A | 3/1988 | Tsubakimoto et al. | |
| 4,771,105 A | 9/1988 | Shirai et al. | |

(Continued)

FOREIGN PATENT DOCUMENTS

CA 2072918 A1 8/1993

(Continued)

OTHER PUBLICATIONS

Barbucci R et al., Swelling behavior of carboxymethylcellulose hydrogels in relation to cross-inking, pH and charge density, *Macromol 33*: 7475-7480 (2000).

(Continued)

*Primary Examiner*—Randy Gulakowski
*Assistant Examiner*—Alicia M Toscano
(74) *Attorney, Agent, or Firm*—Christensen O'Connor Johnson Kindness

(57) ABSTRACT

Method for crosslinking a carboxylated polymer using a triazine crosslinking activator, method for crosslinking a mixture of first and second carboxylated polymers a triazine crosslinking activator, a crosslinked carboxylated polymer having ionic crosslinks, and a composition comprising first and second carboxylated polymers treated with an amount of an amine compound to form plurality of amide bonds

9 Claims, 2 Drawing Sheets

U.S. PATENT DOCUMENTS

| | | | |
|---|---|---|---|
| 4,783,510 A | 11/1988 | Saotome | |
| 4,972,007 A | 11/1990 | Herzog et al. | |
| 5,026,596 A | 6/1991 | Saotome | |
| 5,221,722 A | 6/1993 | Sehm | |
| 5,247,072 A | 9/1993 | Ning et al. | |
| 5,324,823 A | 6/1994 | Asakawa et al. | |
| 5,532,221 A | 7/1996 | Huang et al. | |
| 5,550,189 A * | 8/1996 | Qin et al. | 525/54.3 |
| 5,561,114 A | 10/1996 | Komai et al. | |
| 5,668,273 A | 9/1997 | Allen et al. | |
| 5,674,567 A * | 10/1997 | Kausch et al. | 427/385.5 |
| 5,734,025 A | 3/1998 | Komai et al. | |
| 5,792,856 A | 8/1998 | Allen et al. | |
| 5,800,418 A | 9/1998 | Ahr | |
| 5,817,713 A | 10/1998 | Pappas et al. | |
| 5,998,511 A | 12/1999 | Westland et al. | |
| 6,015,936 A | 1/2000 | Takai et al. | |
| 6,020,536 A | 2/2000 | Österdahl et al. | |
| 6,063,982 A | 5/2000 | Martin et al. | |
| 6,083,211 A | 7/2000 | DesMarais | |
| 6,107,356 A | 8/2000 | DesMarais | |
| 6,107,538 A | 8/2000 | Young et al. | |
| 6,121,409 A | 9/2000 | Mitchell et al. | |
| 6,135,987 A | 10/2000 | Tsai et al. | |
| H1909 H | 11/2000 | Ahr | |
| 6,184,271 B1 | 2/2001 | Westland et al. | |
| 6,229,007 B1 * | 5/2001 | Tye et al. | 536/32 |
| 6,270,845 B1 | 8/2001 | Pappas et al. | |
| 6,271,278 B1 | 8/2001 | Park et al. | |
| 6,303,544 B1 | 10/2001 | Maas et al. | |
| 6,500,947 B1 | 12/2002 | West et al. | |
| 6,593,468 B1 | 7/2003 | Lange et al. | |
| 6,602,994 B1 | 8/2003 | Cash et al. | |
| 6,656,974 B1 | 12/2003 | Renn et al. | |
| 6,686,464 B1 | 2/2004 | Harding et al. | |
| 6,734,298 B1 * | 5/2004 | Barbucci et al. | 536/55.1 |
| 6,765,042 B1 * | 7/2004 | Thornton et al. | 523/400 |

FOREIGN PATENT DOCUMENTS

| | | |
|---|---|---|
| EP | 0 566 118 B2 | 10/1993 |
| EP | 0 796 070 B1 | 9/1997 |
| WO | WO 95/11925 A1 | 5/1995 |
| WO | WO 96/15137 A1 | 5/1996 |
| WO | WO 99/20318 A2 | 4/1999 |
| WO | WO 00/27886 A1 | 5/2000 |
| WO | WO 0027886 A1 * | 5/2000 |
| WO | WO 0035504 A1 * | 6/2000 |
| WO | WO 00/47628 A2 | 8/2000 |
| WO | WO 03033038 A1 * | 4/2003 |

OTHER PUBLICATIONS

Heinze et al., "Studies on the synethsus and characterization fo carboxymethylcellulose," *Die Ang Makro Chem* 266: 37-45 (1999).

Kalman et al., "Effect of the reaction condition on the degree of substitution on carboxymethyl cellulose," *Colloid Polym Sci* 266: 716-720 (1999).

Klemm et al., "Etherization of Cellulose, *Comprehensive Cellulose Cehmistry*, vol. 2: *Functionalization of Cellulose*," and Appendix, p. 353, Wiley-VCH (2001).

Zhang et al, "Solvent effect on carboxymethylation of cellulose," *J Appl Poly Sci* 49: 741-746 (1993).

Rayle, H.L., and L. Fellmeth, "Development of a Process for Triazine-Promoted Amidation of Carboxylic Acids," *Organic Process Research & Development* 3(3):172-176, 1999 (published on Web Mar. 31, 1999).

* cited by examiner

CROSSLINKED MIXED CARBOXYLATED POLYMER NETWORK

FIELD OF THE INVENTION

The present invention relates to a crosslinked carboxylated polymer network.

BACKGROUND OF THE INVENTION

Methods for crosslinking cellulose are well known. In conventional methods for crosslinking cellulose, cellulose hydroxyl groups are reacted with a crosslinking agent having at least two functional groups that are reactive toward the cellulose hydroxyl groups. Traditional crosslinking agents include dialdehydes, such as glutaraldehyde, which provide acetal crosslinks, and polycarboxylic acid crosslinking agents, such as citric acid, that provide ester crosslinks.

Carboxylated celluloses may be crosslinked either through the cellulose hydroxyl groups, or by using a crosslinking agent that is reactive toward the cellulose carboxylic acid groups. Crosslinking agents useful in crosslinking carboxylated cellulose through its carboxyl groups include crosslinking agents having two or more hydroxyl groups, so as to provide diester crosslinks, and crosslinking agents that include two or more amino groups, so as to provide diamide crosslinks. Although diamide crosslinks are more stable than diester crosslinks, amide formation is oftentimes more difficult than ester formation.

Typically, amides are prepared by coupling an amine with an acid chloride derived from a carboxylic acid. Although acid chlorides are highly reactive, the preparation of an acid chloride from a carboxylic acid in large scale poses significant difficulties due to the reagents necessary for making the acid chloride. Most importantly, because acid chlorides are sensitive to water, and because cellulose modification is often carried out in aqueous medium, acid chlorides are not suitable for the formation of cellulose amides. Amidation methods using acid anhydrides as reactive intermediates are also known. However, like acid chlorides, acid anhydrides are also difficult to prepare in aqueous media.

The disadvantages of the use of acid chlorides and anhydrides in amidation methods has caused the development of alternative synthetic processes for amidation. One approach involves the generation of an activated carboxylic acid intermediate that is then treated with an amine in situ to form an amide product.

Recently, a process for triazine-promoted amidation of carboxylic acids has been developed. In the method, amides are prepared from carboxylic acids using a triazine reagent as a promoter. In the method, 2,4,6-trichloro-1,3,5-triazine (also known as cyanuric chloride) is treated with three equivalents of a carboxylic acid in the presence of base in a polar organic solvent to provide the activated carboxylic acid derivative. To the activated carboxylic acid derivative is added an amine in an amount that is a slight excess relative to the carboxylic acid. The product of the reaction is the corresponding amide that is readily separated from the cyanuric acid by-product.

Despite the advances in the development of amidation processes, a need exists for the formation of cellulose amides in aqueous environments typically used for cellulose modification. The present invention seeks to fulfill this need and provides further related advantages. The present invention provides a method for the amidation of cellulose promoted by triazine reagents. In the method, a cellulose carboxylic acid is converted to a cellulose amide by reaction of the carboxylic acid group with a triazine reagent to provide an activated carboxylic acid derivative in situ that is then reacted with an amine to provide a cellulose amide. In the method of the invention, the modification of the cellulose carboxylic acid is carried out in an aqueous environment.

SUMMARY OF THE INVENTION

The invention provides a crosslinked polymer network (i.e., composition) comprising a first carboxylated polymer having a plurality of carboxyl groups and a second carboxylated polymer having a plurality of carboxyl groups treated with an amount of an amine compound (e.g., a diamine or a polyamine) having at least two amino groups reactive toward the carboxyl groups to form plurality of amide bonds.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
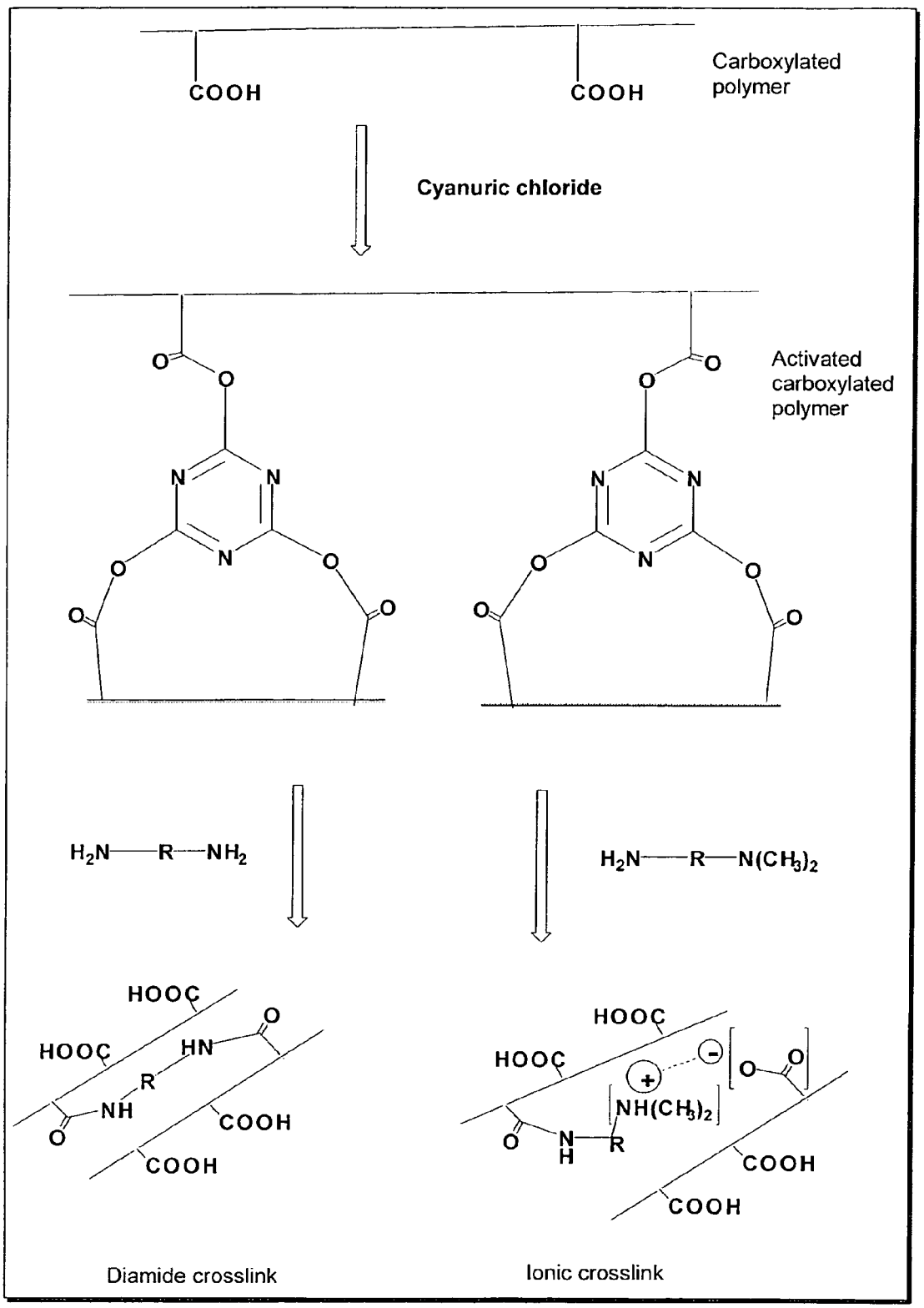
FIG. 1 is a schematic illustration of a diamide crosslink and an ionic crosslink formed in accordance with the present invention.

In one aspect, the present invention provides a crosslinked carboxylated polymer and a method for crosslinking a carboxylated polymer.

In the method, a carboxylated polymer having a plurality of carboxyl groups is treated with a triazine crosslinking activator to provide an activated carboxylated polymer. The activated carboxylated polymer is then reacted with an amine compound (e.g., a diamine or a polyamine) having at least one amino group reactive toward an activated carboxyl group of the activated carboxylated polymer to form a plurality of amide bonds. The plurality of amide bonds results in polymer crosslinking thereby providing a crosslinked carboxylated polymer.

As used herein, the term "carboxylated polymer" refers to a polymer having a plurality of carboxyl groups (i.e., carboxylic acid groups or carboxylate salt groups). In one embodiment, the carboxylated polymer is a carboxyalkyl cellulose, such as a carboxymethyl cellulose or carboxyethyl cellulose. In one embodiment, the carboxylated polymer is a carboxy cellulose in which the C6 hydroxyl glucose group has been oxidized to a carboxylic acid group (i.e., a glucuronic acid). Other carboxylated polymers include polysaccharides that are natural, synthetic, or semi-synthetic in origin. Exemplary polysaccharides include hyaluronic acids, carboxymethyldextran, carboxyalkyl starches, alginic acids, carboxymethyl or butyl glucans or chitosans. In one embodiment, the carboxylated polymer is a polyacrylic acid. In one embodiment, the carboxylated polymer is a polymaleic acid. In one embodiment, the carboxylated polymer is a polyaspartic acid. In one embodiment, the carboxylated polymer is a copolymer of acrylic acid and acrylamide (i.e., a poly(acrylamide-co-acrylic acid)). In one embodiment, the carboxylated polymer is an at least partially hydrolyzed polyacrylamide polymer.

The term "activated carboxylated polymer" refers to a carboxylated polymer in which one or more of the plurality of the carboxyl groups are activated for reaction with an amine to provide an amide by treatment with a triazine crosslinking activator. The crosslinking activator is a halogenated triazine. In one embodiment, the crosslinking activator is 2,4,6-trichloro-1,3,5-triazine (also known as cyanuric chloride). In one embodiment, the crosslinking activator is 2-chloro-4,6-dimethoxy-1,3,5-triazine.

In one embodiment of the method, the carboxylated polymer is treated with the triazine crosslinking activator in an aqueous solvent.

In the method, the activated carboxylated polymer is reacted with an amine compound (e.g., a diamine or a polyamine). As used herein, the term "polyamine" refers to an amine having three or more amino groups. In one embodiment, the diamine or polyamine is a water-soluble diamine or water-soluble polyamine. The diamine or polyamine includes either a primary amino group or a secondary amino group. In one embodiment, the diamine or polyamine includes two primary amino groups. In one embodiment, the diamine or polyamine includes a primary amino group and a secondary amino group. In one embodiment, the diamine or polyamine includes two secondary amino groups. In one embodiment, the diamine or polyamine is a poly(oxyalkylene)diamine.

To effect amide bond formation with a carboxylated polymer, the amine-containing crosslinking agents useful in the methods of the invention include at least one primary amino group. To effect diamide crosslink formation, the amine-containing crosslinking agent includes two primary amino groups. In one embodiment, the crosslinking agent is a diamine having two primary amino groups. In another embodiment, the crosslinking agent is a polyamine (i.e., an amine that includes three or more amino groups) having at least two primary amino groups. To effect ionic crosslink formation, the amine-containing crosslinking agent includes at least one primary amino group or reactive secondary amino group for amide bond formation and a secondary, tertiary, or quaternary amino group for ionic association with a carboxylated polymer's carboxylic acid group.

In one embodiment, the crosslinking agent is a polyether diamine. Suitable polyether diamines include polyalkylene diamines, for example, polyalkylene diamines commercially available from Huntsman Corp., Houston, Tex., under the designation JEFFAMINE. Representative polyalkylene diamines useful in the crosslinking methods of the invention are described and depicted below. In one embodiment, the crosslinking agent is a polyether polyamine, such as a polyalkylene polyamine commercially available from Huntsman Corp., Houston, Tex., under the designation JEFFAMINE. In certain embodiments, the polyoxyalkylene diamines include two or more primary amine groups.

In one embodiment, the crosslinking agent is a polyalkylene polyamine. Suitable polyalkylene polyamines include, for example, diethylenetriamine, triethylenetetraamine, and tetraethylenepentaamine.

Representative primary diamines and polyamines (e.g., tri-, tetra-, and pentamines) useful in crosslinking methods of the invention include JEFFAMINE D-230 (molecular weight 230), JEFFAMINE D-400 (molecular weight 400), and JEFFAMINE D-2000 (molecular weight 2000) depicted below having formula (1), where x is an integer sufficient to provide the indicated molecular weight (i.e., x=2-3, 5-6, and about 33, respectively); JEFFAMINE XTJ-510 (D-4000) (molecular weight 4000), JEFFAMINE XTJ-50 (ED-600) (molecular weight 600) (y=2, and x+z=2), JEFFAMINE XTJ-501 (ED-900) (molecular weight 900), and JEFFAMINE XTJ-502 (ED-2003) (molecular weight 2000) (y=39, and x+Z=6) depicted below having formula (2), where x, y, and z are integers sufficient to provide the indicated molecular weight; JEFFAMINE XTJ-504 (EDR-148) (molecular weight 148) depicted below having formula (3); JEFFAMINE HK-511 (molecular weight 225) depicted below as having formula (4); and ethylenediamine, diethylenetriamine, triethylenetetraamine, and tetraethylenepentaamine, also depicted below.

$$NH_2CH(CH_3)CH_2\text{---}[OCH_2CH(CH_3)]_x\text{---}NH_2 \quad (1)$$

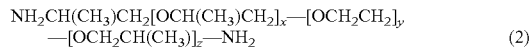

$$NH_2CH(CH_3)CH_2[OCH(CH_3)CH_2]_x\text{---}[OCH_2CH_2]_y\text{---}[OCH_2CH(CH_3)]_z\text{---}NH_2 \quad (2)$$

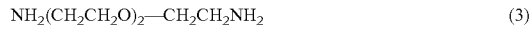

$$NH_2(CH_2CH_2O)_2\text{---}CH_2CH_2NH_2 \quad (3)$$

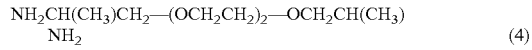

$$\begin{array}{l}NH_2CH(CH_3)CH_2\text{---}(OCH_2CH_2)_2\text{---}OCH_2CH(CH_3)\\ \quad NH_2 \end{array} \quad (4)$$

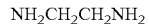

$$NH_2CH_2CH_2NH_2$$

$$NH_2CH_2CH_2NHCH_2CH_2NH_2$$

$$NH_2CH_2CH_2NHCH_2CH_2NHCH_2CH_2NH_2$$

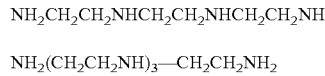

$$NH_2(CH_2CH_2NH)_3\text{---}CH_2CH_2NH_2$$

Other representative primary polyamines (i.e., triamines) useful in crosslinking methods of the invention include JEFFAMINE T-403 (molecular weight 440) depicted below having formula (5), where x, y, and z are integers sufficient to provide the indicated molecular weight; and JEFFAMINE T-5000 (molecular weight 5000) and JEFFAMINE XTJ-509 (T-3000) (molecular weight 3000) depicted below having formula (6), where x, y, and z are integers sufficient to provide the indicated molecular weight.

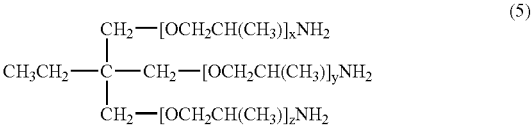

$$CH_3CH_2\text{---}C\begin{array}{l}CH_2\text{---}[OCH_2CH(CH_3)]_xNH_2\\ |\\ \text{---}CH_2\text{---}[OCH_2CH(CH_3)]_yNH_2\\ |\\ CH_2\text{---}[OCH_2CH(CH_3)]_zNH_2\end{array} \quad (5)$$

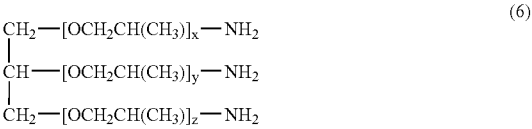

$$\begin{array}{l}CH_2\text{---}[OCH_2CH(CH_3)]_x\text{---}NH_2\\ |\\ CH\text{---}[OCH_2CH(CH_3)]_y\text{---}NH_2\\ |\\ CH_2\text{---}[OCH_2CH(CH_3)]_z\text{---}NH_2\end{array} \quad (6)$$

In one embodiment, the crosslinking method provides a crosslinked carboxylated polymer that includes one or more diamide crosslinks. As used herein, the term "diamide crosslink" refers to a crosslink that includes two amide bonds. A diamide crosslink is formed by reaction of a first activated carboxyl group with a diamine or polyamine to provide a first amide, the resulting amide having a second amino group reactive toward a second activated carboxyl group, and subsequent reaction of a second activated carboxyl group with the second amino group to provide a second amide.

A diamide crosslink formed in accordance with the present invention is illustrated schematically in FIG. 1. FIG. 1 illustrates an intermolecular diamide crosslink. It will be appreciated that the diamide crosslink formed in accordance with the invention can also be an intramolecular diamide crosslink (i.e., a diamide crosslink within one carboxylated polymer chain).

The preparation of a representative diamide crosslinked carboxymethyl cellulose polymer is described in Example 1. The absorbent properties (i.e., free swell capacity, centrifuge capacity, and absorbency under load (AUL)) of representative diamide crosslinked carboxymethyl cellulose polymers are summarized in Table 2 below.

As noted above, in the method, the activated carboxylated polymer is reacted with a diamine or polyamine that includes either a primary amino group or a secondary amino group. In one embodiment, in addition to the primary or secondary amino group, the diamine or polyamine also includes either a tertiary amino group or a quaternary amino group. In one embodiment, the diamine or polyamine includes a primary amino group and at least one of a tertiary amino group or a quaternary amino group. In one embodiment, the diamine or polyamine includes a secondary amino group and at least one of a tertiary amino group or a quaternary amino group. In one embodiment, the diamine is 3-(dimethylamino)propylamine.

Representative crosslinking agents including secondary and tertiary amine groups useful in crosslinking methods of the invention include dimethylaminopropylamine (DMAPA), aminopropylmorpholine, N-aminoethylpiperazine, aminopropylmonomethylethanolamine, diethylenetriamine, triethylenetetraamine, and tetraethylenepentaarmine. Dimethylaminopropylamine (DMAPA), aminopropylmorpholine, N-aminoethylpiperazine, aminopropylmonomethylethanolamine are depicted below.

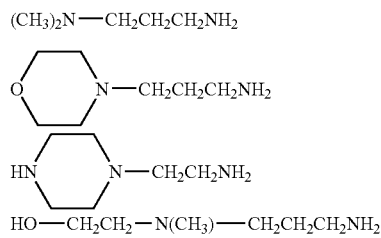

In one embodiment, the crosslinking method provides a crosslinked carboxylated polymer that includes one or more ionic crosslinks. As used herein, the term "ionic crosslink" refers to a crosslink that includes an amide bond and an ionic bond or association between an amino group and a carboxyl group. An ionic crosslink is formed by reaction of a first activated carboxyl group with a diamine or polyamine to provide a first amide, the resulting amide having a second amino group that is ionically reactive or associative toward a second carboxyl group.

An ionic crosslink formed in accordance with the present invention is illustrated schematically in FIG. 1. FIG. 1 illustrates an intermolecular ionic crosslink. It will be appreciated that the ionic crosslink formed in accordance with the invention can also be an intramolecular ionic crosslink (i.e., an ionic crosslink within one carboxylated polymer chain).

The preparation of a representative ionic crosslinked carboxymethyl cellulose polymer is described in Example 2. The absorbent properties (i.e., free swell capacity, centrifuge capacity, and absorbency under load (AUL)) of representative ionic crosslinked carboxymethyl cellulose polymers are summarized in Table 1. Methods for measuring free swell capacity and centrifuge capacity are described in Example 7. A method for measuring absorbency under load (AUL) is described in Example 8.

In one embodiment, the crosslinked carboxylated polymer made by the method of the invention includes one or more diamide crosslinks and one or more ionic crosslinks.

The amount of second polymer used in the method can range from about 1 to about 99 percent by weight based on the weight of the first carboxylated polymer.

The crosslinked polymers of the invention have a free swell capacity of from about 10 to about 80 g/g, a centrifuge capacity of from about 10 to about 60 g/g, and absorbency under load (AUL) of from about 5 to about 35 g/g.

In another aspect, the invention provides a crosslinked carboxylated polymer. The crosslinked carboxylated polymer includes a plurality of carboxyl groups that are treated with an amount of a diamine or polyamine having at least one amino group reactive toward a carboxyl group of the carboxylated polymer to form an amide bond and at least one amino group that is reactive toward a carboxyl group of the carboxylated polymer to form an ionic bond.

In one embodiment, the crosslinked carboxylated polymer comprises a carboxylated polymer having plurality of crosslinks, each of the plurality of crosslinks comprising a first bond and a second bond. In the crosslinked polymer, the first bond is an amide bond formed between a carboxyl group of the carboxylated polymer and a first amino group of a crosslinking agent, and the second bond is an ionic bond formed between a carboxyl group of the carboxylated polymer and a second amino group of the crosslinking agent.

In another aspect, the invention provides a method for crosslinking a mixture of first carboxylated polymers and second carboxylated polymers. In the method, a mixture of a first carboxylated polymer having a plurality of carboxyl groups and a second carboxylated polymer having a plurality of carboxyl groups is treated with a triazine crosslinking activator to provide a mixture of first and second activated carboxylated polymers, which are subsequently reacted with either a diamine or polyamine having two amino groups reactive toward activated carboxyl groups, or a diamine or polyamine having one amino group reactive toward activated carboxyl groups and one amino group that is not reactive toward activated carboxyl groups.

In one embodiment, the mixture of activated carboxylated polymers is reacted with a diamine or polyamine having two amino groups (i.e., two primary amino groups, two secondary amino groups, or a primary amino group and a secondary amino group) reactive toward activated carboxyl groups of the first and second activated carboxylated polymers to form a plurality of diamide crosslinks to provide a crosslinked carboxylated polymer.

The preparations of representative diamide crosslinked carboxylated polymer products (i.e., diamide crosslinked mixtures of a carboxymethyl cellulose polymer and a second carboxylated polymer) are described in Examples 3 and 4. The absorbent properties (i.e., free swell capacity, centrifuge capacity, and absorbency under load (AUL)) of representative diamide crosslinked mixtures of a carboxymethyl cellulose

TABLE 1

Representative Ionic Crosslinked Carboxymethyl Cellulose Polymers: Absorbent Properties.

| Carboxymethyl Cellulose | Cyanuric Chloride (wt %) | Dimethyamino propylamine (wt %) | Yield (%) | Free Swell (g/g) | Centrifuge (g/g) | AUL (g/g) |
|---|---|---|---|---|---|---|
| CMC 9H4F | 2.0 | 3.2 | 89.15 | 38.36 | 25.84 | 19.27 |
| CMC 9H4F | 5.4 | 9.0 | 98.36 | 41.51 | 29.68 | 16.46 |
| CMC 9H4F | 1.0 | 1.6 | 78.66 | 29.25 | 16.00 | 19.12 |
| CMC 9H4F | 2.8 | 4.8 | 98.19 | 24.08 | 14.08 | 17.11 |
| CMC (Weyerhaeuser) | 2.0 | 3.2 | 56.47 | 17.24 | 7.89 | 11.00 |
| CMC (Weyerhaeuser) | 2.0 | 3.2 | 67.89 | 20.89 | 10.17 | 13.79 | polymer and a second carboxylated polymer are summarized in Table 2.

In the above tables, "Poly(AcAmCoAc)" refers to poly (acrylamide-co-acrylic acid).

TABLE 2

Representative Diamide Crosslinked Carboxymethyl Cellulose Polymers: Absorbent Properties.

| Second Polymer (wt %) | Cyanuric Chloride (wt %) | Diamine (wt %) | Yield (%) | Free Swell (g/g) | Centrifuge (g/g) | AUL (g/g) |
|---|---|---|---|---|---|---|
| Polyacrylic Acid (10%) | 1.8 | JEFFAMINE 400 (6.1) | 109.94 | 41.51 | 25.91 | 15.52 |
| Polyacrylic Acid (10%) | 3.5 | JEFFAMINE 400 (11.5) | 104.77 | 33.75 | 20.87 | 14.97 |
| Polyacrylic Acid (10%) | 6.3 | JEFFAMINE 400 (20) | 97.14 | 36.25 | 23.46 | 15.87 |
| Polyacrylic Acid (10%) | 8.6 | JEFFAMINE 400 (28) | 87.48 | 29.43 | 20.64 | 13.92 |
| Polyacrylic Acid (10%) | 10.5 | JEFFAMINE 400 (34.2) | 83.68 | 30.58 | 21.28 | 9.75 |
| — | 5.0 | JEFFAMINE 400 (16.3) | 84.85 | 31.34 | 20.05 | 16.44 |
| — | 5.0 | JEFFAMINE 230 (10.0) | 92.17 | 34.74 | 21.86 | 15.12 |
| Poly(AmCoAc) (10%) | 2.0 | JEFFAMINE 400 (7.2) | 104.13 | 40.36 | 22.07 | 16.20 |
| Poly(AmCoAc) (9.5%) | 3.9 | JEFFAMINE 400 (12.6) | 100.19 | 34.53 | 22.01 | 19.93 |
| Poly(AmCoAc) (8.8%) | 5.4 | JEFFAMINE 400 (19.4) | 94.79 | 30.17 | 19.95 | 18.48 |
| Poly(AmCoAc) (8.5%) | 6.9 | JEFFAMINE 400 (22.5) | 95.68 | 20.65 | 19.27 | 17.18 |

In another embodiment, the mixture of activated carboxylated polymers is reacted with a diamine or polyamine having one amino group that is reactive toward the activated carboxyl groups of the first and second activated carboxylated polymers to form a plurality of amide bonds and a second amino group (i.e., a tertiary amino group or a quaternary amino group) that is not covalently reactive toward the activated carboxyl groups of the first and second activated carboxylated polymers. The resulting polymer is a crosslinked carboxylated polymer having a plurality of amide bonds and a plurality of ionic bonds between the non-covalently reactive amino group (i.e., tertiary or quaternary amino groups) and carboxyl groups, thereby effectively crosslinking the polymers to provide a crosslinked carboxylated polymer. In certain cases, secondary amino groups may also be non-covalently reactive toward activated carboxyl groups and therefore useful for forming ionic crosslinks.

The preparations of representative ionic crosslinked carboxylated polymer products (i.e., ionic crosslinked mixtures of a carboxymethyl cellulose polymer and a second carboxylated polymer) are described in Examples 5 and 6. The absorbent properties (i.e., free swell capacity, centrifuge capacity, and absorbency under load (AUL)) of representative ionic crosslinked mixtures of a carboxymethyl cellulose polymer and a second carboxylated polymer are summarized in Table 3.

In one embodiment of the method, the mixture of the first and second carboxylated polymers are treated with a triazine crosslinking activator in an aqueous solvent.

To further illustrate various embodiments of the methods of the invention, the following representative exemplary methods are provided.

As noted above, in one embodiment, the present method for crosslinking carboxylic acid-containing polymers (carboxylated polymers) provides crosslinked carboxylic acid polymers that include diamide (or polyamide) crosslinks. In the method, carboxylate salts of carboxylated polymers in aqueous medium are activated with a triazine crosslinking activator (e.g., cyanuric chloride) and crosslinked with a diamine or a polyamine (that includes primary and/or secondary amino groups) to form diamide or polyamide crosslinks.

If a single carboxylated polymer in aqueous solution is crosslinked with cyanuric chloride activation and a diamine or a polyamine, the amide bonds may bridge two or more carboxylated polymer chains (i.e., intermolecular crosslinking). The crosslinker may also form amide bonds within a single polymer chain having multiple carboxylic acid groups (i.e., intramolecular crosslinking).

If a mixture of polycarboxylated polymers in aqueous solution is crosslinked with cyanuric chloride activation and a diamine or a polyamine, the amide bonds may bridge two or more carboxylated polymer chains of the same polymer or

TABLE 3

Representative Ionic Crosslinked Carboxymethyl Cellulose Polymers: Absorbent Properties.

| Second Polymer (wt %) | Cyanuric Chloride (wt %) | Dimethylamino propylamine (wt %) | Yield (%) | Free Swell (g/g) | Centrifuge (g/g) | AUL (g/g) |
|---|---|---|---|---|---|---|
| Polyacrylic Acid (10%) | 0.9 | 1.3 | 111.5 | 59.20 | 43.00 | 21.07 |
| Polyacrylic Acid (10%) | 1.7 | 2.7 | 108.06 | 67.30 | 50.82 | 17.07 |
| Polyacrylic Acid (10%) | 2.5 | 4.2 | 108.36 | 66.37 | 45.42 | 14.02 |
| Polyacrylic Acid (10%) | 4.7 | 7.8 | 108.23 | 61.85 | 44.99 | 15.81 |
| Poly(AcAmCoAc) (10%) | 0.9 | 1.3 | 107.96 | 54.09 | 31.26 | 13.95 |
| Poly(AcAmCoAc) (10%) | 1.7 | 2.7 | 111.98 | 45.93 | 24.93 | 14.21 |
| Poly(AcAmCoAc) (10%) | 2.5 | 4.2 | 115.78 | 48.44 | 23.43 | 13.10 |
| Poly(AcAmCoAc) (10%) | 4.7 | 7.8 | 111.52 | 41.28 | 19.95 | 13.30 | different polymers (i.e., intermolecular crosslinking). The crosslinker may also form amide bonds with a single polymer chain of one type of polymer in the mixture having multiple carboxylic acid groups (i.e., intramolecular crosslinking).

In another embodiment, the present method for crosslinking carboxylic acid-containing polymers provides crosslinked carboxylic acid polymers that include ionic crosslinks. In the method, carboxylate salts of carboxylated polymers in aqueous medium are activated with a triazine crosslinking activator (e.g., cyanuric chloride) and crosslinked with a diamine or a polyamine (that includes at least one or more primary and/or secondary amino groups and at least one or more tertiary or quaternary amino groups) to form ionic crosslinks.

If a single carboxylated polymer in aqueous solution is crosslinked with cyanuric chloride activation and a diamine, the amide bond is formed by reaction of the primary amino group with carboxylic acid group of a carboxylated polymer. The unreacted quaternary amino, tertiary amino, or less reactive secondary amino terminal may form an ionic bond or association with another carboxylic acid group of the same polymer chain (i.e., intramolecular crosslinking) or an ionic bond or association with a carboxylic acid group of another polymer chain of the same polymer (i.e., intermolecular crosslinking).

If a single carboxylated polymer in aqueous solution is crosslinked with cyanuric chloride activation and a polyamine, an amide bond is formed by reaction of the primary amino group with carboxylic acid group of a carboxylated polymer. If more than one primary amino group is present in the polyamine, then crosslinking described above for diamines (or polyamines) applies. If only one primary amino group is present in the polyamine, the unreacted tertiary amino or less reactive secondary amino terminals may form ionic bonds or associations with other carboxylic acid groups of the same polymer chain (i.e., intramolecular crosslinking) or ionic bonds or associations with carboxylic acid groups of another polymer chain of the same polymer (i.e., intermolecular crosslinking).

If a mixture of carboxylated polymers in aqueous solution is crosslinked with cyanuric chloride activation and a diamine, an amide bond is formed by reaction of the primary amino group with carboxylic acid group of a carboxylated polymer. The unreacted quaternary amino, tertiary amino, or less reactive secondary amino terminal may form an ionic bond or association with another carboxylic acid group of the same polymer chain (i.e., intramolecular crosslinking) or an ionic bond or association with a carboxylic acid group of another polymer chain of the same polymer (i.e., intramolecular crosslinking) or a different polymer (i.e., intermolecular crosslinking).

If a mixture of carboxylated polymers in aqueous solution is crosslinked with cyanuric chloride activation and a polyamine, an amide bond is formed by reaction of the primary amino group with carboxylic acid group of a carboxylated polymer. If more than one primary amino group is present in the polyamine, then crosslinking described for diamines (or polyamines) applies. If only one primary amino group is present in the polyamine, the unreacted quaternary amino, tertiary amino, or less reactive secondary amino terminals may form ionic bonds or associations with other carboxylic acid groups of the same polymer chain (i.e., intramolecular crosslinking), or ionic bonds or associations with carboxylic acid groups of another polymer chain of the same polymer (i.e., intramolecular crosslinking) or different polymer (i.e., intermolecular crosslinking).

In another aspect, the invention provides a composition comprising a first carboxylated polymer having a plurality of carboxyl groups and a second carboxylated polymer having a plurality of carboxyl groups treated with an amount of an amine compound (e.g., a diamine or a polyamine) having at least two amino groups reactive toward the carboxyl groups to form a plurality of amide bonds.

In one embodiment, the composition comprises a plurality of first carboxylated polymers, a plurality of second carboxylated polymers, and a plurality of crosslinks, each of the plurality of crosslinks comprising a first bond and a second bond. The first bond is an amide bond formed between a carboxyl group of the first or second carboxylated polymers and a first amino group of a crosslinking agent (e.g., a diamine or a polyamine), and the second bond is an amide bond formed between a carboxyl group of the first or second carboxylated polymers and a second amino group of the crosslinking agent.

In one embodiment, the composition comprises a plurality of first carboxylated polymers, a plurality of second carboxylated polymers, and a plurality of crosslinks, each of the plurality of crosslinks comprising a first bond and a second bond. The first bond is an amide bond formed between a carboxyl group of the first or second carboxylated polymers and a first amino group of a crosslinking agent (e.g., a diamine or a polyamine), and the second bond is an ionic bond formed between a carboxyl group of the first or second carboxylated polymers and a second amino group of the crosslinking agent.

The present invention provides a method for the amidation of cellulose promoted by triazine reagents. In the method, a cellulose carboxylic acid is converted to a cellulose amide by reaction of the carboxylic acid group with a triazine reagent to provide an activated carboxylic acid derivative in situ that is then reacted with an amine to provide a cellulose amide. In the method of the invention, the modification of the cellulose carboxylic acid is carried out in an aqueous environment.

The following examples are provided for the purpose of illustrating, not limiting, the invention.

EXAMPLES

Example 1

The Preparation and Absorbent Properties of a Representative Diamide Crosslinked Carboxylated Polymer: Crosslinked Carboxymethyl Cellulose In this example, the preparation and absorbent properties of a representative diamide crosslinked carboxylated polymer are described. Carboxymethyl cellulose activated by cyanuric chloride was crosslinked with a poly(oxyalkylene)diamine as described below.

Carboxymethyl cellulose, sodium salt (Aqualon 9H4F), 10.0 g, was dissolved in 1000 mL de-ionized water with efficient stirring to give a homogeneous solution. The carboxyl activating agent, cyanuric chloride (Sigma-Aldrich), 0.60 g, was added as a fine powder and mixed. The mixture was allowed to stand at 25° C. for 3 hours. A primary diamine, JEFFAMINE D-230, MW=230 (Huntsman), 1.12 g, was added and mixed. The mixture was allowed to stand for 10 hours at 25° C. The crosslinked polymer was then precipitated with 4000 mL technical acetone. The precipitated polymer was filtered. Another 500 mL acetone was added to the precipitated polymer and stirred to remove most of the water from the polymer. The regenerated polymer was filtered and air dried at 25° C. to give the polymer product. A sample of the polymer product was ground to particle size of 300-800 μm

Example 2

The Preparation and Absorbent Properties of a Representative Ionic Crosslinked Carboxylated Polymer: Crosslinked Carboxymethyl Cellulose

In this example, the preparation and absorbent properties of a representative ionic crosslinked carboxylated polymer are described. Carboxymethyl cellulose activated by cyanuric chloride was crosslinked with dimethylaminopropylamine as described below.

Carboxymethyl cellulose, sodium salt (Aqualon 9H4F), 10.0 g, was dissolved in 1000 mL de-ionized water with efficient stirring to give a homogeneous solution. The carboxyl activating agent, cyanuric chloride (Sigma-Aldrich), 0.20 g, was then added and mixed. The mixture was allowed to stand for 3 hours at 25° C. Dimethylaminopropylamine (DMAPA) (Sigma-Aldrich), 0.33 g, was added and mixed. The mixture was allowed to stand for 10 hours at 25° C. The crosslinked polymer was then precipitated with 4000 mL technical acetone. The precipitated polymer was filtered. Another 500 mL acetone was added to the precipitated polymer and stirred to remove most of the water from the polymer. The regenerated polymer was filtered and air dried at 25° C. to give the polymer product. A sample of the polymer product was ground to particle size of 300-800 μm and tested for free swell (38.4 g/g), centrifuge capacity (25.8 g/g), and absorbance under load (19.2 g/g) in 1% saline solution.

Example 3

The Preparation and Absorbent Properties of a Representative Diamide Crosslinked Carboxylated Polymer: Crosslinked Carboxymethyl Cellulose/Polyacrylic Acid

In this example, the preparation and absorbent properties of a representative diamide crosslinked carboxylated polymer are described. A mixture of carboxymethyl cellulose and polyacrylic acid activated by cyanuric chloride was crosslinked with a poly(oxyalkylene)diamine as described below.

Carboxymethyl cellulose, sodium form (Aqualon 9H4F), 4.5 g, and polyacrylic acid, MW=4,000,000 (Sigma-Aldrich), 0.5 g, was completely dissolved in 500 mL de-ionized water and mixed to give a homogeneous polymer mixture. The pH was adjusted to 7.0 with 10% aqueous sodium carbonate solution. The carboxyl activating agent, cyanuric chloride (Sigma-Aldrich), 0.20 g, was added as a fine powder and mixed well. The mixture was allowed to stand at 25° C. for 3 hours. A primary diamine, JEFFAMINE 400, MW=400 (Huntsman), 0.65 g, was added and mixed. The mixture was allowed to stand for 10 hours at 25° C. The crosslinked polymer mixture was precipitated with 2.0 L technical acetone. The precipitate was separated and stirred in another 500 mL acetone to completely remove water. The regenerated polymer was filtered and air dried to give the polymer product.

The polymer product was ground to particle size 300-800 μm and tested for free swell (33.7 g/g), centrifuge capacity (20.8 g/g), and absorbance under load (14.9 g/g) in 1% saline solution.

Example 4

The Preparation and Absorbent Properties of a Representative Diamide Crosslinked Carboxylated Polymer: Crosslinked Carboxymethyl Cellulose/Poly(Acrylamide-co-Acrylic Acid)

In this example, the preparation and absorbent properties of a representative diamide crosslinked carboxylated polymer are described. A mixture of carboxymethyl cellulose and poly(acrylamide-co-acrylic acid) activated by cyanuric chloride was crosslinked with a poly(oxyalkylene)diamine as described below.

Carboxymethyl cellulose, sodium salt, (Aqualon), 4.0 g. and poly(acrylamide-co-acrylic acid), MW=5,000,000 (Sigma-Aldrich), 0.46 g (0.61 g with 15% water and 10% sodium sulfate), was stirred in 400 mL de-ionized water to give a homogeneous solution. The carboxyl activating agent, cyanuric chloride (Sigma-Aldrich), 0.20 g, was added as a fine powder and mixed. The mixture was allowed to stand at 25° C. for 3 hours. A primary diamine, JEFFAMINE D-400, MW=400 (Huntsman), 0.65 g, was added and mixed. The mixture was allowed to stand for 10 hours at 25° C. The crosslinked polymer was then precipitated with 1600 mL technical acetone. The precipitated product was filtered. The regenerated product was placed in another 500 mL acetone and stirred to remove most of the water from the fiber. The polymer product was filtered and air dried at 25° C. to give polymer product. A sample of polymer product was ground to particle size 300-800 μm and tested for free swell (34.5 g/g), centrifuge capacity (22.0 g/g) and, absorbance under load (19.9 g/g) in 1% saline solution.

Example 5

The Preparation and Absorbent Properties of a Representative Ionic Crosslinked Carboxylated Polymer: Crosslinked Carboxymethyl Cellulose/Polyacrylic Acid

In this example, the preparation and absorbent properties of a representative ionic crosslinked carboxylated polymer are described. A mixture of carboxymethyl cellulose and polyacrylic acid activated by cyanuric chloride was crosslinked with dimethylaminopropylamine as described below.

Carboxymethyl cellulose, sodium salt (Aqualon), 4.0 g, and polyacrylic acid, MW=4,000,000 (Sigma-Aldrich), 0.46 g, was dissolved in 200 mL de-ionized water with efficient mixing to give a homogeneous solution. The pH was adjusted to 7.0 with 10% aqueous sodium carbonate solution. The carboxyl activating agent, cyanuric chloride (Sigma-Aldrich), 0.04 g, was added as a fine powder and mixed. The mixture was allowed to stand for 3 hours at 25° C. Dimethylaminopropylamine (DMAPA) (Sigma-Aldrich), 0.06 g, was added and mixed. The mixture was allowed to stand for 10 hours at 25° C. The crosslinked polymer was then precipitated with 1600 mL technical acetone. The precipitated polymer was filtered. Another 500 mL acetone was added to the precipitated polymer and stirred to remove most of the water from the fiber. The regenerated polymer was filtered and air dried at 25° C. to give the polymer product. A sample of the polymer product was ground to particle size of 300-800 μm and tested for free swell (59.2 g/g), centrifuge capacity (43.0 g/g), and absorbance under load (21.0 g/g) in 1% saline solution.

Example 6

The Preparation and Absorbent Properties of a Representative Ionic Crosslinked Carboxylated Polymer: Crosslinked Carboxymethyl Cellulose/Poly(Acrylamide-co-Acrylic Acid)

In this example, the preparation and absorbent properties of a representative ionic crosslinked carboxylated polymer are described. A mixture of carboxymethyl cellulose poly (acrylamide-co-acrylic acid) activated by cyanuric chloride was crosslinked with dimethylaminopropylamine as described below.

Carboxymethyl cellulose, sodium salt (Aqualon), 4.0 g, and poly(acrylamide-co-acrylic acid), MW=5,000,000 (Sigma-Aldrich), 0.46 g (0.61 g with 15% water and 10% sodium sulfate) was dissolved in 200 mL de-ionized water to give a homogeneous solution. The carboxyl activating agent, cyanuric chloride (Sigma-Aldrich), 0.04 g, was added as a fine powder and mixed well. The mixture was allowed to stand for 3 hours at 25° C. Dimethylaminopropylamine (DMAPA) (Sigma-Aldrich), 0.06 g, was added and mixed. The mixture was allowed to stand for 10 hours at 25° C. The crosslinked polymer was then precipitated with 1600 mL technical acetone. The precipitated polymer was filtered. Another 500 mL acetone was added and stirred to remove most of the water from the polymer. The polymer was filtered and air dried at 25° C. to give the polymer product. A sample of the polymer product was ground to particle size of 300-800 μm and tested for free swell (54.0 g/g), centrifuge capacity (31.2 g/g) and absorbance under load (13.9 g/g) in 1% saline solution.

Example 7

Method for Determining Free Swell Capacity and Centrifuge Capacity

In this example, a method for determining free swell capacity (g/g) and centrifuge capacity (g/g) is described.

The materials, procedure, and calculations to determine free swell capacity (g/g) and centrifuge capacity (g/g) were as follows.

Test Materials:

Japanese pre-made empty tea bags (available from Drugstore.com, IN PURSUIT OF TEA polyester tea bags 93 mm×70 mm with fold-over flap. (http:www.mesh.ne.jp/tokiwa/).

Balance (4 decimal place accuracy, 0.0001 g for air-dried superabsorbent polymer (AD SAP) and tea bag weights).

Timer.

1% Saline.

Drip rack with clips (NLM 211)

Lab centrifuge (NLM 211, Spin-X spin extractor, model 776S, 3,300 RPM, 120 v).

Test Procedure:

1. Determine solids content of AD SAP.
2. Pre-weigh tea bags to nearest 0.0 μg and record.
3. Accurately weigh 0.2025 g+/−0.0025 g of test material (SAP), record and place into pre-weighed tea bag (air-dried (AD) bag weight). (AD SAP weight+AD bag weight=total dry weight).
4. Fold tea bag edge over closing bag.
5. Fill a container (at least 3 inches deep) with at least 2 inches with 1% saline.
6. Hold tea bag (with test sample) flat and shake to distribute test material evenly through bag.
7. Lay tea bag onto surface of saline and start timer.
8. Soak bags for specified time (e.g., 30 minutes).
9. Remove tea bags carefully, being careful not to spill any contents from bags, hang from a clip on drip rack for 3 minutes.
10. Carefully remove each bag, weigh, and record (drip weight).
11. Place tea bags onto centrifuge walls, being careful not to let them touch and careful to balance evenly around wall.
12. Lock down lid and start timer. Spin for 75 seconds.
13. Unlock lid and remove bags. Weigh each bag and record weight (centrifuge weight).

Calculations:

The tea bag material has an absorbency determined as follows:

Free Swell Capacity, factor=5.78
Centrifuge Capacity, factor=0.50
Free Capacity (g/g):

$$\frac{[\text{drip wt (g)} - \text{dry bag wt (g)} - (AD\ SAP\ \text{wt (g)})] - [\text{dry bag wt (g)} * 5.78]}{[AD\ SAP\ \text{wt (g)} * Z]}$$

Centrifuge Capacity (g/g):

$$\frac{[\text{centrifuge wt (g)} - \text{dry bag wt (g)} - (AD\ SAP\ \text{wt (g)})] - [\text{dry bag wt (g)} * 0.50]}{[AD\ SAP\ \text{wt (g)} * Z]}$$

$Z$ = Oven dry $SAP$ (g) / Air dry $SAP$ (g)

Example 8

Method for Determining Absorbency Under Load (AUL)

In this example, a method for determining Absorbency Under Load (AUL) is described.

Figure 2:
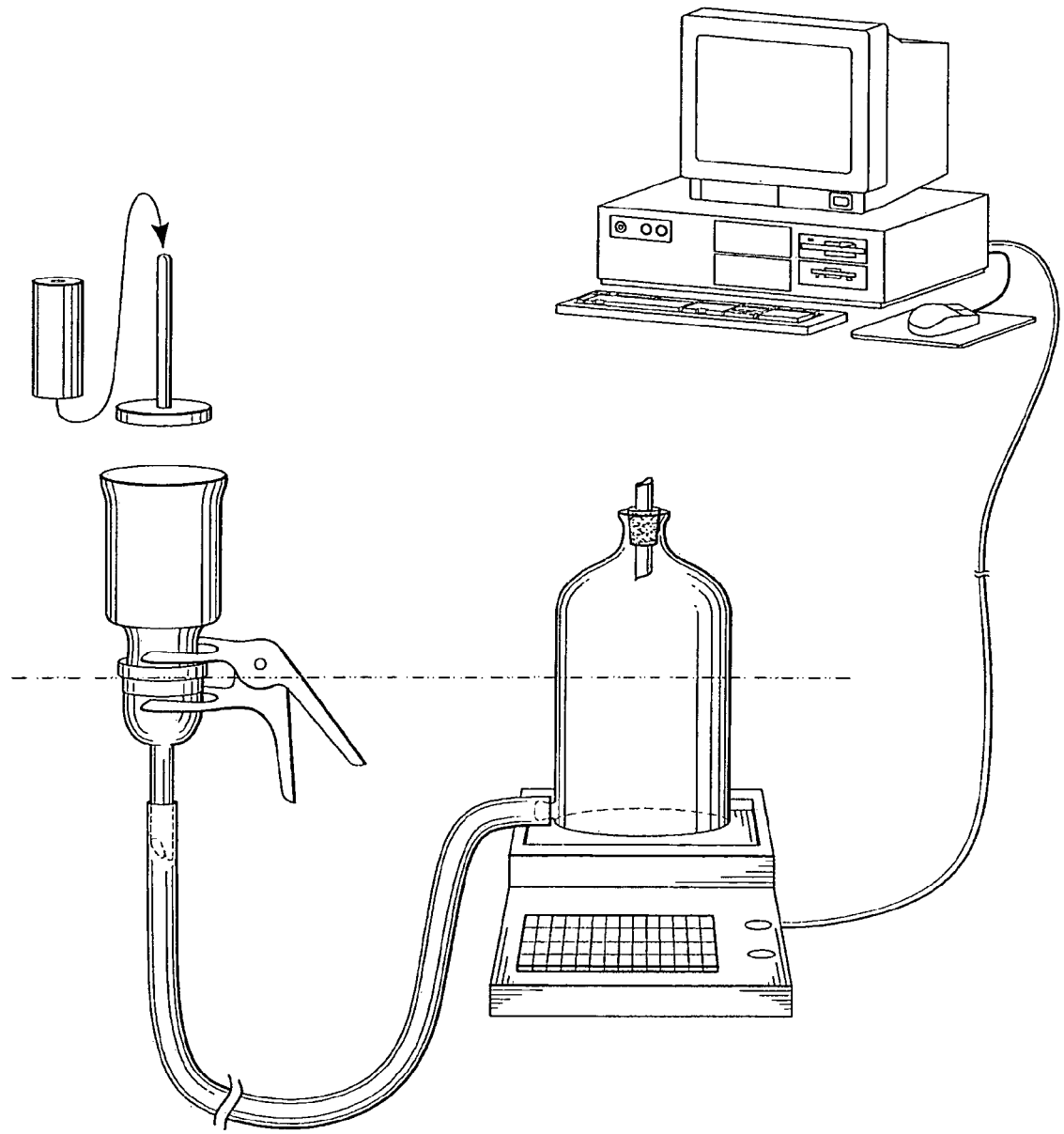
FIG. 2 is a schematic illustration of a device for measuring Absorbency Under Load (AUL) values.

The materials, procedure, and calculations to determine AUL were as follows. Reference is made to FIG. 2.

Test Materials:

Mettler Toledo PB 3002 balance and BALANCE-LINK software or other compatible balance and software. Software set-up: record weight from balance every 30 sec (this will be a negative number. Software can place each value into EXCEL spreadsheet.

Kontes 90 mm ULTRA-WARE filter set up with fritted glass (coarse) filter plate. clamped to stand.

2 L glass bottle with outlet tube near bottom of bottle.

Rubber stopper with glass tube through the stopper that fits the bottle (air inlet).

TYGON tubing.

Stainless steel rod/plexiglass plunger assembly (71 mm diameter).

Stainless steel weight with hole drill through to place over plunger (plunger and weight=867 g)

VWR 9.0 cm filter papers (Qualitative 413 catalog number 28310-048) cut down to 80 mm size.

Double-stick SCOTCH tape.

0.9% Saline.

Test Procedure:

1. Level filter set-up with small level.
2. Adjust filter height or fluid level in bottle so that fritted glass filter and saline level in bottle are at same height.
3. Make sure that there are no kinks in tubing or air bubbles in tubing or under fritted glass filter plate.

4. Place filter paper into filter and place stainless steel weight onto filter paper.

5. Wait for 5-10 min while filter paper becomes fully wetted and reaches equilibrium with applied weight.

6. Zero balance.

7. While waiting for filter paper to reach equilibrium prepare plunger with double stick tape on bottom.

8. Place plunger (with tape) onto separate scale and zero scale.

9. Place plunger into dry test material so that a monolayer of material is stuck to the bottom by the double stick tape.

10. Weigh the plunger and test material on zeroed scale and record weight of dry test material (dry material weight 0.15 g+/−0.05 g).

11. Filter paper should be at equilibrium by now, zero scale.

12. Start balance recording software.

13. Remove weight and place plunger and test material into filter assembly.

14. Place weight onto plunger assembly.

15. Wait for test to complete (30 or 60 min)

16. Stop balance recording software.

Calculations:

$A$ = balance reading $(g)*-1$ (weight of saline absorbed by test material)

$B$ = dry weight of test material (this can be corrected for moisture by multiplying the AD weight by solids %).

$AUL(g/g) = A/B (g\ 1\%\ saline/1\ g\ test\ material)$

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A composition, comprising a first carboxylated polymer having a plurality of carboxyl groups and a second carboxylated polymer having a plurality of carboxylated groups having some carboxyl groups activated, treated-with an amount of an amine compound having only one amino group reactive with an activated carboxyl group to form one amide bond, and one or more tertiary or quaternary amino groups forming ionic bonds with carboxyl groups, wherein the first carboxylated polymer and the second carboxylated polymer are different and wherein the second carboxylated polymer is selected from the group consisting of a polyacrylic acid, a polymaleic acid, a polyaspartic acid, and a copolymer of acrylic acid and acrylamide.

2. The composition of claim 1, wherein the first carboxylated polymer is a carboxyalkyl cellulose.

3. The composition of claim 1, wherein the first carboxylated polymer is a carboxymethyl cellulose or a carboxyethyl cellulose.

4. The composition of claim 1, wherein the first carboxylated polymer is a carboxymethyl cellulose and the second carboxylated polymer is a polyacrylic acid.

5. The composition of claim 1, wherein the amine compound includes one of a primary amino group or a secondary amino group.

6. The composition of claim 1, wherein the amine compound includes a primary amino group and at least one of a tertiary amino group or a quaternary amino group.

7. The composition of claim 1, wherein the amine compound includes a secondary amino group and at least one of a tertiary amino group or a quaternary amino group.

8. The composition of claim 1, wherein the amine compound is 3-(dimethylamino)propylamine.

9. A composition, comprising a plurality of first carboxylated polymers, a plurality of second carboxylated polymers, and a plurality of crosslinks, each of the plurality of crosslinks comprising a first bond and a second bond, wherein the first carboxylated polymers and the second carboxylated polymers are different and wherein the second carboxylated polymer is selected from the group consisting of a polyacrylic acid, a polymaleic acid, a polyaspartic acid, and a copolymer of acrylic acid and acrylamide, wherein the first bond is an amide bond formed between a carboxyl group of the first or second caitoxylated polymers and a primary or secondary amino group of a crosslinking agent, wherein the crosslinking agent has only one primary or secondary amino group, and wherein the second bond is an ionic bond formed between a carboxyl group of the first or second carboxylated polymers and a tertiary or quaternary amino group of the crosslinking agent.

* * * * *